United States Patent
Akiba et al.

(10) Patent No.: US 10,321,669 B2
(45) Date of Patent: Jun. 18, 2019

(54) REEL SEAT HAVING FIBER-REINFORCED RESIN SHEET IN FIXED HOOD AND FISHING ROD HAVING THE REEL SEAT

(71) Applicant: Globeride, Inc., Tokyo (JP)

(72) Inventors: Masaru Akiba, Tokyo (JP); Katsuhiro Oikawa, Tokyo (JP)

(73) Assignee: Globeride, Inc., Tokyo (JP)

( * ) Notice: Subject to any disclaimer, the term of this patent is extended or adjusted under 35 U.S.C. 154(b) by 147 days.

(21) Appl. No.: 14/584,574

(22) Filed: Dec. 29, 2014

(65) Prior Publication Data

US 2015/0181852 A1    Jul. 2, 2015

(30) Foreign Application Priority Data

Dec. 27, 2013   (JP) .................... 2013-272062

(51) Int. Cl.
*A01K 87/06* (2006.01)

(52) U.S. Cl.
CPC .................... *A01K 87/06* (2013.01)

(58) Field of Classification Search
CPC ......... A01K 87/00; A01K 87/06; A01K 97/00
See application file for complete search history.

(56) References Cited

U.S. PATENT DOCUMENTS

| | | | | |
|---|---|---|---|---|
| 4,637,157 A | * | 1/1987 | Collins | A01K 87/06 43/22 |
| 4,648,195 A | * | 3/1987 | Kim | A01K 87/06 43/20 |
| 4,702,032 A | * | 10/1987 | Ohmura | A01K 87/06 43/22 |
| 4,726,139 A | * | 2/1988 | Tokuda | A01K 87/06 43/22 |
| 4,802,299 A | * | 2/1989 | Ohmura | A01K 87/06 43/22 |
| 5,194,207 A | * | 3/1993 | Tokuda | A01K 87/06 156/187 |

(Continued)

FOREIGN PATENT DOCUMENTS

| | | |
|---|---|---|
| GB | 2 185 671 | 11/1989 |
| GB | 2 245 468 | 1/1992 |

(Continued)

OTHER PUBLICATIONS

Extended European Search Report dated Jun. 1, 2015 for Appln. No. 14200443.1.

(Continued)

*Primary Examiner* — Thanh Pham
(74) *Attorney, Agent, or Firm* — Pillsbury Winthrop Shaw Pittman, LLP

(57) ABSTRACT

One object is to provide a reel seat allowing reinforcement of a hood for retaining a reel leg while maintaining the appearance and restricting the increase in weight, and a fishing rod having such a reel seat. A reel seat according to an embodiment of the present invention includes a fixed hood for retaining one end of a reel leg on the reel seat body, and a fiber-reinforced resin sheet is provided so as to extend over an outer circumference of the fixed hood and an outer circumference of the reel seat body. The reinforcement fibers may extend over the entire length of the fiber-reinforced resin sheet. The reinforcement fibers in the fiber-reinforced resin sheet extend in a direction slanted or orthogonal with respect to a longitudinal direction of the rod.

7 Claims, 2 Drawing Sheets

(56) References Cited

U.S. PATENT DOCUMENTS

| | | | | |
|---|---|---|---|---|
| 5,222,319 | A * | 6/1993 | Yamato | A01K 87/06 43/22 |
| 5,291,683 | A * | 3/1994 | Yamato | A01K 87/06 43/22 |
| 5,347,742 | A * | 9/1994 | Ohmura | A01K 87/06 43/22 |
| 5,481,820 | A * | 1/1996 | Ohmura | A01K 87/06 43/22 |
| 6,105,301 | A * | 8/2000 | Ohmura | A01K 87/06 43/22 |
| 6,871,441 | B1 * | 3/2005 | Tsurufuji | A01K 87/06 43/22 |
| 2005/0000145 | A1 * | 1/2005 | Ohmura | A01K 87/06 43/22 |
| 2011/0272079 | A1 * | 11/2011 | Lepage | A01K 87/00 156/85 |

FOREIGN PATENT DOCUMENTS

| | | |
|---|---|---|
| JP | 61-185142 | 8/1986 |
| JP | 01-121369 | 8/1989 |
| JP | 2506854 | 8/1996 |
| JP | 2005-013090 | 1/2005 |
| JP | 2007-202407 | 8/2007 |
| JP | 2007-209259 | 8/2007 |
| JP | 2011-067123 | 4/2011 |
| JP | 4979489 B2 | 7/2012 |
| KR | 10-2009-0107399 A | 10/2009 |

OTHER PUBLICATIONS

Chinese Office Action dated Sep. 1, 2016 for Appln. No. 201410787216.7.

Japanese Office Action dated Oct. 19, 2016 for Appln. No. 2013-272062.

Office Action Korean Patent Application No. 10-2014-0185840 dated Jun. 8, 2017 with English translation.

Second Office Action Issued in Chinese Patent Application No. 201410787216.7 dated Mar. 14, 2017 with English translation.

Third Office Action Issued in Chinese Patent Application No. 201410787216.7 dated Jun. 8, 2017 with English translation.

* cited by examiner

REEL SEAT HAVING FIBER-REINFORCED RESIN SHEET IN FIXED HOOD AND FISHING ROD HAVING THE REEL SEAT

CROSS-REFERENCE TO RELATED APPLICATIONS

This application is based on and claims the benefit of priority from Japanese Patent Application Serial No. 2013-272062 (filed on Dec. 27, 2013), the contents of which are hereby incorporated by reference in their entirety.

TECHNICAL FIELD

The present invention relates to a reel seat and a fishing rod having the reel seat.

BACKGROUND

A reel is typically mounted on a fishing rod via a reel seat. Conventional reel seats comprises a reel seat body mounted on a rod of a fishing rod, a fixed hood mounted on the reel seat body and receiving one end of a reel leg, and a movable hood mounted on the reel seat body so as to be movable with respect to the fixed hood and receiving the other end of the reel leg. To mount a reel on such a reel seat, the one end of the reel leg is inserted into an opening in the fixed hood (an opening formed between the fixed hood and the reel leg setting surface) with the reel leg set on a reel leg setting surface of the reel seat body, while the movable hood is moved toward the fixed hood to insert the other end of the reel leg into an opening in the movable hood, such that the reel leg may be retained by the fixed hood and the movable hood.

In winding up a caught fish, the reel is pulled in a direction away from the rod due to a tension in the fishing line; therefore, the hood retaining the reel leg undergoes a strong tension in the direction away from the reel leg setting surface. To prevent damage on the hood due to such a tension, there is a demand for reinforcing the hood of the reel seat.

In view of the above, Japanese Patent Application Publication No. 2007-202407 (the "'407 Publication") disclosed a reel seat having its hood formed of a fiber-reinforced resin for reinforcement of the hood. Additionally, Japanese Utility Model Registration Publication No. 2506854 (the "'854 Publication") disclosed a reel leg crimping hood which is entirely formed of a fiber-reinforced resin. In this case, the hood is formed of a fiber-reinforced resin for reinforcement of the hood.

Since fibers have higher specific gravities, fiber-reinforced resins have larger weights than ordinary resins. Therefore, if the hood is formed of a fiber-reinforced resin as in the '407 Publication and the '854 Publication, the weight of the reel seat is larger.

Alternatively, the hood can be formed in a larger thickness to prevent damage on the hood, but such a hood degrades the appearance of the reel seat and the fishing rod. Additionally, a hood made of metal increases the weight more significantly.

SUMMARY

One object of the present invention is to provide a reel seat allowing reinforcement of a hood for retaining a reel leg while maintaining the appearance and restricting the increase in weight, and a fishing rod having such a reel seat.

Other objects of the embodiments of the present invention will be apparent with reference to the entire description in this specification.

A reel seat according to an embodiment of the present invention is provided on a rod of a fishing rod and includes: a reel seat body having a reel leg setting surface on which a reel leg is to be set; a fixed hood provided on the reel seat body, for accommodating one end of the reel leg set on the reel leg setting surface into an opening formed between the fixed hood and the reel leg setting surface; a movable hood provided on the reel seat body so as to be movable with respect to the fixed hood and configured to accommodate the other end of the reel leg; and a fiber-reinforced resin sheet including reinforcement fibers and extending over an inner wall of the fixed hood and the reel leg setting surface forming the opening. In an embodiment of the present invention, the reinforcement fibers in the fiber-reinforced resin sheet extend in a direction slanted or orthogonal with respect to a longitudinal direction of the rod.

In the embodiment, the fiber-reinforced resin sheet may extend over the inner wall of the fixed hood and the reel leg setting surface forming an opening for accommodating one end of a reel leg, and the reinforcement fibers may extend in a direction slanted or orthogonal with respect to a longitudinal direction of the rod. Therefore, even when a tension is imparted on the fixed hood by the reel leg in a direction away from the fishing rod, the reinforcement fibers may support the fixed hood. Thus, the fixed hood can be reinforced with the fiber-reinforced resin sheet of the embodiment. Additionally, the fixed hood reinforced with the fiber-reinforced resin sheet may include less amount of fiber-reinforced resin and have a smaller weight as compared to a fixed hood entirely formed of a fiber-reinforced resin. Since the fiber-reinforced resin sheet may extend over the inner wall of the fixed hood and the reel leg setting surface forming the opening, the appearance may not be degraded.

As stated above, the embodiments of the present invention provide a reel seat allowing reinforcement of a hood for retaining a reel leg while maintaining the appearance and restricting the increase in weight, and a fishing rod having such a reel seat.

DESCRIPTION OF EXAMPLE EMBODIMENTS

Figure 1:
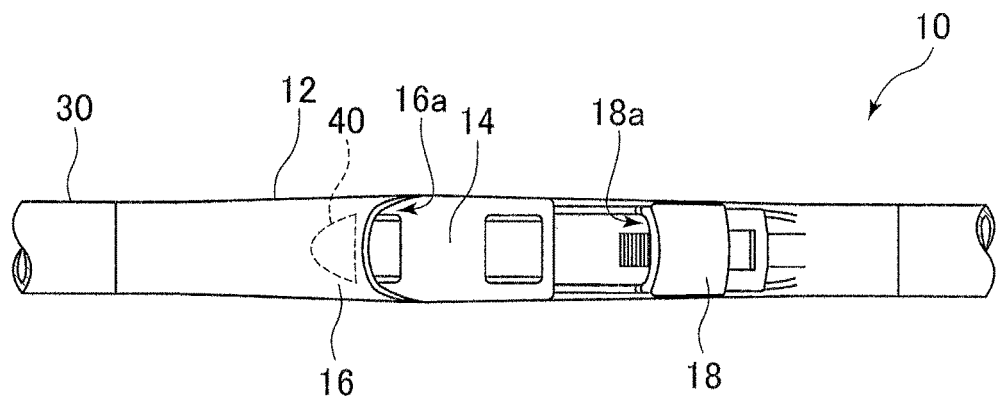
FIG. 1 is a plain view of a reel seat according to an embodiment of the invention.

Various embodiments of the present disclosure will now be described with reference to the attached drawings. In the drawings, the same or similar components are denoted by the same or similar reference signs, and the detailed description of the same or similar components is appropriately omitted.

Figure 2:
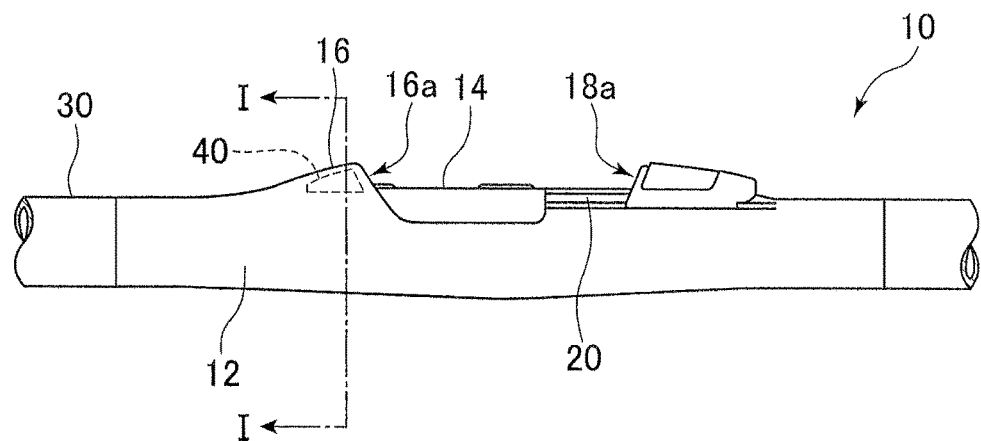
FIG. 2 is a side view of a reel seat according to an embodiment of the invention.

As shown in FIGS. 1 and 2, a reel seat 10 according to one embodiment of the present invention may include a tubular reel seat body 12 through which a rod 30 of a fishing rod is to be inserted, a fixed hood 16, and a movable hood 18. The reel seat body 12 may have a reel leg setting surface 14 which has a substantially plain profile and on which a leg (not shown) of the reel is to be set. The reel seat body 12 may be integrally formed by injection molding using various synthetic resins such as methyl meta-acrylate.

The fixed hood 16 according to an embodiment of the present invention may be disposed on a rod tip-side end of the reel leg setting surface 14 and may retain one end of the leg of the reel. The movable hood 18 according to an embodiment of the present invention may be disposed on a butt-side end of the reel leg setting surface 14 and may retain the other end of the leg of the reel. In the embodiment, the reel seat body 12 and the fixed hood 16 may be integrally formed. The reel seat body 12 and the fixed hood 16 may be formed of different members. When a reel is mounted, the opposite ends of the leg of the reel may be received by an opening 16a formed between the fixed hood 16 and the reel leg setting surface 14 and an opening 18a formed between the movable hood 18 and the reel leg setting surface 14, respectively.

In an embodiment of the present invention, the movable hood 18 may be disposed so as to be movable toward and away from the fixed hood 16 along guide portions (guide grooves) 20 formed in both longitudinal side surfaces of the rod 30. The guide portion 20 may be engaged with an engagement portion integrally formed with the movable hood 18. Thus, the movable hood 18 may be guided along the longitudinal direction of the reel seat 10 so as not to move off the reel seat body 12. In an embodiment of the present invention, the reel can be tightly fixed by turning down a securing lever (not shown) integrally provided on the movable hood 18 so as to engage a locking nail of the securing lever with a movable hood-engaging indented member (not shown) provided on the reel seat body 12. The movable hood 18 may also be a screw-type movable hood having a nut for tightly fixing the reel on the butt side. In FIG. 1, the fixed hood 16 is positioned on the rod tip side, while the movable hood 18 is positioned on the butt side. This positional relationship may also be reversed. That is, the fixed hood 16 may be positioned on the butt side, and the movable hood 18 may be positioned on the rod tip side.

Figure 3:
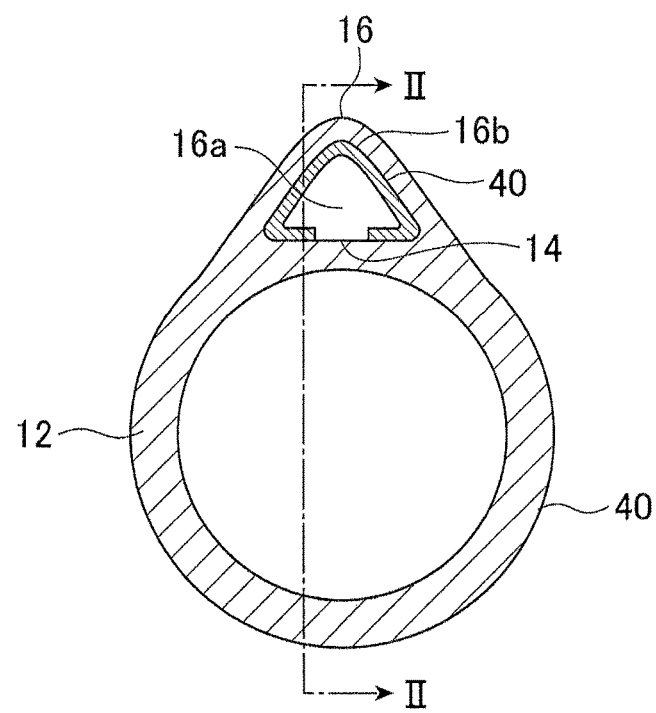
FIG. 3 is a sectional view along the I-I line in FIG. 2.
Figure 4:
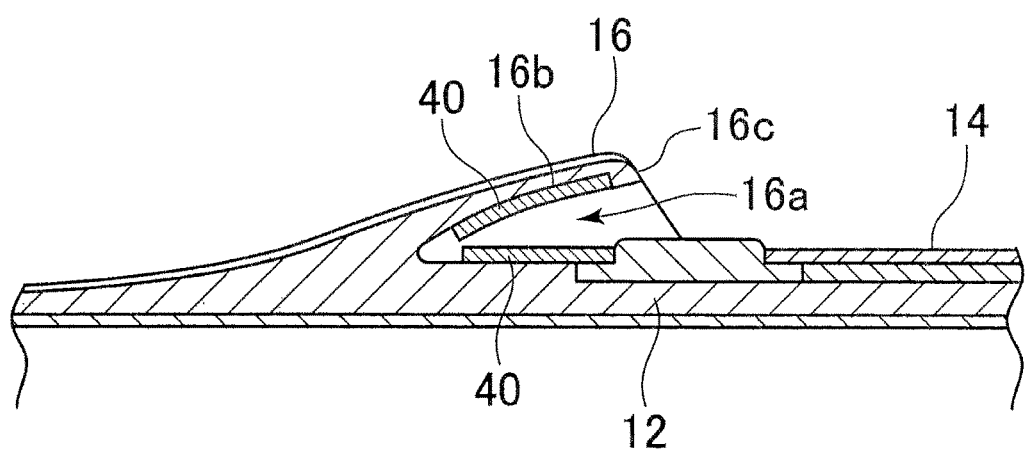
FIG. 4 is an enlarged sectional view showing a part of the II-II section of FIG. 3 in an enlarged scale.

In the embodiment, a fiber-reinforced resin sheet 40 may be provided in the opening 16a formed between the fixed hood 16 and the reel leg setting surface 14. FIG. 3 is a sectional view along the I-I line in FIG. 2; and FIG. 4 is an enlarged sectional view showing a part of the II-II section of FIG. 3 in an enlarged scale. The part may include the fixed hood 16. As shown in FIGS. 3 and 4, the fiber-reinforced resin sheet 40 may extend over the inner wall 16b of the fixed hood 16 and the reel leg setting surface 14 forming the opening 16a. In the embodiment, the fiber-reinforced resin sheet 40 may have a sectional shape similar to the outline of the opening 16a (the outline formed by the inner wall 16b of the fixed hood 16 and the reel leg setting surface 14 opposed thereto). The fiber-reinforced resin sheet 40 may be provided so as to leave a linear gap extending on the reel leg setting surface 14 in the longitudinal direction of the rod 30 (see FIG. 3). That is, the fiber-reinforced resin sheet 40 may not be provided on the entire surface of the reel leg setting surface 14; and the region of the reel leg setting surface 14 not in contact with the fiber-reinforced resin sheet 40 may form a gap extending in the longitudinal direction of the rod 30. The fiber-reinforced resin sheet 40 may not extend to the rod tip-side end of the opening 16a (see FIG. 4). The fiber-reinforced resin sheet 40 may be provided so as not to leave a gap on the reel leg setting surface 14 (that is, to cover the entire circumference of the reel leg setting surface 14) or so as to extend to the rod tip-side end of the opening 16a.

At the butt-side end of the inner wall 16b of the fixed hood 16 may be formed a projection 16c projecting toward the rod 30 so as to make the opening 16a narrower. Such a projection 16c may define a recess along with the inner wall 16b; and the fiber-reinforced resin sheet 40 may be accommodated in the recess, as shown in FIG. 4. In an embodiment of the present invention, the recess may be configured such that, when the recess accommodates the fiber-reinforced resin sheet 40, the exposed surface of the fiber-reinforced resin sheet 40 is substantially flush with the surface of the projection 16c facing the rod 30 (that is, the thickness of the recess provided in the inner wall 16b is substantially equal to the thickness of the fiber-reinforced resin sheet 40). Thus, since the fiber-reinforced resin sheet 40 may be flush with the surface of the projection 16c, a force may be uniformly imparted on the fixed hood 16 from the reel leg, which may prevent concentration of stress on the projection 16c or a part of the fiber-reinforced resin sheet 40.

Similarly, a recess may be provided in the reel leg setting surface 14, for accommodating the fiber-reinforced resin sheet 40. More specifically, as shown in FIG. 4, the rod tip-side end of the reel leg setting surface 14 (the region of the reel leg setting surface 14 forming the opening 16a) may be provided with a recess toward the rod 30 which is lower than the butt side. The fiber-reinforced resin sheet 40 accommodated in the recess may be substantially flush with the butt side of the reel leg setting surface 14 (that is, the thickness of the recess provided at the rod tip-side end of the reel leg setting surface 14 may be substantially equal to the thickness of the fiber-reinforced resin sheet 40). Thus, since the fiber-reinforced resin sheet 40 is substantially flush with the butt side of the reel leg setting surface 14, the reel leg can be more smoothly accommodated into the opening 16a, and the reel leg can be more stably supported.

As shown in FIG. 3, the fixed hood 16 of this embodiment may have a curved surface different from that of the reel seat body 12 in the sectional view in the longitudinal direction of the fishing rod. In the reel seat 10 of the embodiment, when a tension is imparted on the fixed hood 16 by the reel leg in the direction away from the fishing rod, a stress may be concentrated on the portion where the cylindrical curved surface of the reel seat body 12 is continuous to the curved surface of the fixed hood (inflection point). In this embodiment, the inflection point may be internally reinforced with the fiber-reinforced resin sheet 40 extending over the inner wall 16b of the fixed hood 16 and the reel leg setting surface 14 forming the opening 16a. The fiber-reinforced resin sheet 40 may be formed by impregnating reinforcement fibers with a resin. The resin with which the reinforcement fibers are impregnated may be a thermoplastic resin such as polypropylene (PP) or polyamide 6 (PA6). The resin part of the fiber-reinforced resin sheet 40 may be formed of a thermosetting resin. The fiber-reinforced resin sheet 40 may be formed in a rectangular shape wherein long reinforcement fibers are arranged in the same direction. The fiber-reinforced resin sheet 40 may be formed in a knit wherein reinforcement fibers are knitted together or formed in a fabric wherein reinforcement fibers are woven.

The reel seat 10 of the embodiment may include a fiber-reinforced resin sheet 40 inside the fixed hood 16 (the opening 16a). Accordingly, less amount of fiber-reinforced resin sheet 40 may be required as compared to the case where the fiber-reinforced resin sheet 40 is provided on the outer surface (outer circumference) of the fixed hood 16 and the reel seat body 12, which may further restrict the increase in weight.

The reinforcement fibers of the fiber-reinforced resin sheet 40 according to an embodiment of the present invention may be composed of, e.g., glass fibers, continuous glass fibers, carbon fibers, aramid fibers, Kevler fibers, polyethylene fibers, or other high strength fibers. The reinforcement fibers may extend over the entire length of the fiber-reinforced resin sheet 40. The fiber-reinforced resin sheet 40 including reinforcement fibers extending over the entire length thereof may be formed by impregnating, with a resin, reinforcement fibers having a length substantially equal to the entire length of the fiber-reinforced resin sheet 40. The reinforcement fibers extending over the entire length of the fiber-reinforced resin sheet 40 may be cleaved when the fiber-reinforced resin sheet 40 is being formed into a shape or used. As a result, the fiber-reinforced resin sheet 40 according to an embodiment of the present invention may include reinforcement fibers shorter than the entire length thereof. Thus, the fiber-reinforced resin sheet 40 of the present invention may include reinforcement fibers inevitably cut short in forming and use.

If the reinforcement fibers in the fiber-reinforced resin sheet 40 extend along the direction in which the rod 30 carrying the reel seat extends, when the reel is pulled in a direction away from the rod due to a tension in the fishing line, the tension imparted by the reel leg may concentrate on a part of reinforcement fibers in the fiber-reinforced resin sheet 40, and the fiber-reinforced resin sheet 40 may be cleaved. Thus, the fiber-reinforced rein sheet 40 according to an embodiment of the present invention may be arranged on the reel seat body 12 such that the reinforcement fibers therein are slanted or orthogonal with respect to the longitudinal direction of the rod 30. In the fiber-reinforced resin sheet 40 according to an embodiment of the present invention, the angle between the direction of the reinforcement fibers extending and the rod 30 may be in a range from 45° to 90°. If the direction of the reinforcement fibers extending is slanted or orthogonal with respect to the longitudinal direction of the rod 30, when a tension is imparted on the fixed hood 16 by the reel in a direction away from the rod 30, the tension imparted on the fixed hood 16 by the reel leg may be dispersed among a plurality of fibers in the fiber-reinforced resin sheet 40. Thus, the fiber-reinforced resin sheet 40 can be prevented from being cleaved, thereby achieving reinforcement of the fixed hood 16.

The fiber-reinforced resin sheet 40 according to an embodiment of the present invention may be heat-welded onto the reel seat body 12. Through heat welding, the resin material serving as a matrix of the fiber-reinforced resin sheet 40 can be tightly adhered to the reel seat body 12.

The matrix of the fiber-reinforced resin sheet 40 according to an embodiment may be formed of the same resin material as the reel seat body 12. Additionally, when the fiber-reinforced resin sheet 40 is heat-welded onto the reel seat body 12, the matrix of the fiber-reinforced resin sheet 40 can be integrated with and tightly bound to the reel seat body 12. The resin material of the matrix of the fiber-reinforced resin sheet 40 may be a thermosetting resin. The resin material of the matrix of the fiber-reinforced resin sheet 40 may be a resin material different from that of the reel seat body 12.

A method of fabricating the reel seat configured as above will be described below. First, a fiber-reinforced resin sheet may be prepared by impregnating reinforcement fibers with a thermoplastic resin such as polypropylene (PP) or polyamide 6 (PA6). In this fiber-reinforced resin sheet, the reinforcement fibers such as carbon fibers may extend over the substantially entire length of the sheet. One example of the fiber-reinforced resin sheet may be the above described fiber-reinforced resin sheet 40. Next, the fiber-reinforced resin sheet heated may be formed, by using a forming die, into a shape suited to be placed on the reel seat, more specifically, a shape of the opening formed by the fixed hood and the reel leg setting surface. The fiber-reinforced resin sheet formed into the shape may be mounted on a die for injection molding of the reel seat (the reel seat body and the fixed hood) at a corresponding position (a position corresponding to the opening); and then the reel seat may be injection molded, wherein the fiber-reinforced resin sheet may be integrated with the reel seat by heat welding. Thus, the reel sheet according to an embodiment of the present invention may be obtained.

The dimensions, material, and arrangement of the elements described herein are not limited to those explicitly described for the embodiments. The elements are susceptible of modifications for desired dimensions, materials, and arrangements within the scope of the present invention. The elements other than those explicitly described herein can be added to the described embodiments; and part of the elements described for the embodiments can be omitted.

What is claimed is:

1. A reel seat provided on a rod of a fishing rod, comprising:
   a reel seat body having a reel leg setting surface on which a reel leg is to be set;
   a fixed hood provided on the reel seat body, for accommodating one end of the reel leg set on the reel leg setting surface into an opening formed between the fixed hood and the reel leg setting surface;
   a movable hood provided on the reel seat body so as to be movable with respect to the fixed hood and configured to accommodate an opposite end of the reel leg; and
   a fiber-reinforced resin sheet including reinforcement fibers and extending over an inner wall of the fixed hood and the reel leg setting surface forming the opening,
   wherein the reinforcement fibers in the fiber-reinforced resin sheet extend in a direction slanted or orthogonal with respect to a longitudinal direction of the rod, and
   wherein a projection projecting toward the rod is formed at a butt-side end of the inner wall of the fixed hood such that the projection defines a recess along with the inner wall, wherein the fiber-reinforced resin sheet is accommodated in the recess, wherein the fiber-reinforced sheet has a thickness that is substantially equal along its entire length to a depth of the recess defined by the projection such that an exposed surface of the fiber-reinforced resin sheet is flush with a surface of the projection, the exposed surface defining an inner surface of the opening formed between the fixed hood and the reel leg setting surface.

2. The reel seat of claim 1, wherein an angle at which the reinforcement fibers are slanted with respect to the longitudinal direction of the rod ranges from 45° to 90°.

3. The reel seat of claim 1, wherein a second recess is provided in the reel leg setting surface for accommodating the thickness of the fiber-reinforced resin sheet therein such that the exposed surface of the fiber-reinforced sheet is substantially flush with a butt-end side of the reel leg setting surface and further defines the opening.

4. The reel seat of claim 1, wherein the thickness of the fiber-reinforced resin sheet is the same as a thickness of the recess.

5. The reel seat of claim 1, wherein
   the reel seat body is formed of a first resin material,
   the fiber-reinforced resin sheet is formed by impregnating the reinforcement fibers with a second resin material, and the first resin material and the second resin material are the same.

6. The reel seat of claim 1, wherein the reinforcement fibers are at least one selected from a group consisting of glass fibers, continuous glass fibers, carbon fibers, aramid fibers, Kevler fibers, and polyethylene fibers.

7. A fishing rod having a real seat, wherein said reel seat comprising:
- a reel seat body having a reel leg setting surface on which a reel leg is to be set;
- a fixed hood provided on the reel seat body, for accommodating one end of the reel leg set on the reel leg setting surface into an opening formed between the fixed hood and the reel leg setting surface;
- a movable hood provided on the reel seat body so as to be movable with respect to the fixed hood and configured to accommodate an opposite end of the reel leg; and
- a fiber-reinforced resin sheet including reinforcement fibers and extending over an inner wall of the fixed hood and the reel leg setting surface forming the opening, wherein the reinforcement fibers in the fiber-reinforced resin sheet extend in a direction slanted or orthogonal with respect to a longitudinal direction of the rod, and wherein a projection projecting toward the rod is formed at a butt-side end of the inner wall of the fixed hood such that the projection defines a recess along with the inner wall, wherein the fiber-reinforced resin sheet is accommodated in the recess, wherein the fiber-reinforced sheet has a thickness that is substantially equal along its entire length to a depth of the recess defined by the projection such that an exposed surface of the fiber-reinforced resin sheet is flush with a surface of the projection, the exposed surface defining an inner surface of the opening formed between the fixed hood and the reel leg setting surface.

* * * * *